US009667963B2

(12) United States Patent
Matsuo et al.

(10) Patent No.: US 9,667,963 B2
(45) Date of Patent: May 30, 2017

(54) METHOD AND APPARATUS FOR ENCODING VIDEO, METHOD AND APPARATUS FOR DECODING VIDEO, AND PROGRAMS THEREFOR

(75) Inventors: Shohei Matsuo, Yokosuka (JP);
Yukihiro Bandoh, Yokosuka (JP);
Seishi Takamura, Yokosuka (JP);
Hirohisa Jozawa, Yokosuka (JP)

(73) Assignee: Nippon Telegraph And Telephone Corporation, Tokyo (JP)

( * ) Notice: Subject to any disclaimer, the term of this patent is extended or adjusted under 35 U.S.C. 154(b) by 315 days.

(21) Appl. No.: 14/125,463

(22) PCT Filed: Jun. 22, 2012

(86) PCT No.: PCT/JP2012/066039
§ 371 (c)(1),
(2), (4) Date: Dec. 11, 2013

(87) PCT Pub. No.: WO2013/002150
PCT Pub. Date: Jan. 3, 2013

(65) Prior Publication Data
US 2014/0105308 A1    Apr. 17, 2014

(30) Foreign Application Priority Data
Jun. 27, 2011 (JP) .................................. 2011-141725

(51) Int. Cl.
*H04N 7/12* (2006.01)
*H04N 19/593* (2014.01)
(Continued)

(52) U.S. Cl.
CPC ....... *H04N 19/00763* (2013.01); *H04N 19/82* (2014.11); *H04N 19/61* (2014.11)

(58) Field of Classification Search
IPC ...................................................... H04N 19/523
See application file for complete search history.

(56) References Cited

U.S. PATENT DOCUMENTS 5,522,009 A * 5/1996 Laurent .................. G10L 19/06
704/221
6,968,008 B1    11/2005 Ribas-Corbera et al.
(Continued)

FOREIGN PATENT DOCUMENTS

CN          101621696 A       1/2010
CN          101945282 A       1/2011
(Continued)

OTHER PUBLICATIONS

Sakae Okubo, Shinya Kadono, Yoshihiro Kikuchi, and Teruhiko Suzuki, "H.264/AVC Textbook: 3rd Revised Edition", Impress R&D, pp. 119-123, 2009, with partial translation.
(Continued)

*Primary Examiner* — Tracy Y Li
(74) *Attorney, Agent, or Firm* — Harness, Dickey & Pierce, P.L.C.

(57) ABSTRACT

The prediction error energy in inter-frame prediction with motion compensation is reduced and the coding efficiency is improved. A video encoding method using fractional-accuracy motion compensation includes: a step of generating multiple weighted filter coefficients from multiple interpolation filter sets using weight parameters which designate weight values of interpolation filter coefficients; a step of selecting weighted filter coefficients which minimize prediction error energy in the fractional-accuracy motion compensation from among the weighted filter coefficients; a step of interpolating fractional-accuracy pixels for a reference picture by application of an interpolation filter with the selected weighted filter coefficients and encoding an input picture with the fractional-accuracy motion compensation;
(Continued)

and a step of encoding the weight parameters used for generating the selected weighted filter coefficients and the interpolation filter coefficients and adding encoded weight parameters and encoded interpolation filter coefficients to an encoded bitstream.

16 Claims, 10 Drawing Sheets

(51) Int. Cl.
*H04N 19/82* (2014.01)
*H04N 19/61* (2014.01)

(56) References Cited

U.S. PATENT DOCUMENTS

| | | | |
|---|---|---|---|
| 7,782,401 B1* | 8/2010 | Chou | G06T 3/403 348/581 |
| 2008/0175322 A1* | 7/2008 | Lee | H04N 19/523 375/240.16 |
| 2009/0257494 A1 | 10/2009 | Ye et al. | |
| 2010/0226432 A1* | 9/2010 | Wittmann | H04N 19/523 375/240.12 |

FOREIGN PATENT DOCUMENTS

| | | |
|---|---|---|
| JP | 2006-157531 A | 6/2006 |
| JP | 2011-082725 A | 4/2011 |
| JP | A-2011-082725 | 4/2011 |
| KR | 10-2011-0042025 A | 4/2011 |
| RU | 2 391 794 C2 | 6/2010 |
| TW | 200644645 A | 12/2006 |
| TW | 201031222 A1 | 8/2010 |
| TW | 201110708 A1 | 3/2011 |
| WO | 2007/100128 A1 | 9/2007 |
| WO | 2008/048864 A2 | 4/2008 |
| WO | 2008/085109 A1 | 7/2008 |
| WO | 2009/046601 A1 | 4/2009 |
| WO | 2010/038858 A1 | 4/2010 |

OTHER PUBLICATIONS

Ken McCann, Woo-Jin Han, Il-Koo Kim, Jung-Hye Min, Elena Alshina, Alexander Alshin, Tammy Lee, Jianle Chen, Vadim Seregin, Sunil Lee, Yoon-Mi Hong, Min-Su Cheon, and Nikolay Shlyakhov, "Samsung's Response to the Call for Proposals on Video Compression Technology", JCTVC-A124 r2, pp. 12-14, 1st JCT-VC Meeting, Dresden, Apr. 15-23, 2010.
Y. Vatis, B. Edler, D. T. Nguyen, and J. Ostermann: "Motion- and aliasing-compensated prediction using a two-dimensional non-separable adaptive Wiener interpolation filter", Proc. ICIP2005, IEEE International Conference on Image Processing, pp. II 894-897, Genova, Italy, Sep. 11-14, 2005.
S. Wittmann and T. Wedi: "Separable adaptive interpolation filter for video coding", Proc. ICIP2008, IEEE International Conference on Image Processing, pp. 2500-2503, San Diego, California, USA, Oct. 12-15, 2008.
Shohei Matsuo, Yukihiro Bandoh, Seishi Takamura, and Hirohisa Jozawa: "Enhanced region-based adaptive interpolation filter", Proc. PCS2010, IEEE Picture Coding Symposium pp. 526-529, Nagoya, Japan, Dec. 7-10, 2010.

Faouzi Kossentini, Nader Mandi, Hsan Guermazi, and Mohammed Ali Ben Ayed: "An Adaptive Interpolation Filtering Technique", JCTVC-E284, 5th JCT-VC Meeting, Geneva, Mar. 16-23, 2011.
Matsuo, S., Bandoh, Y., Ito, T., Takamura, S., and Jozawa, H., CE3: Region-based adaptive interpolation filter, Joint Collaborative Team on Video Coding (JCT-VC) of ITU-T SG16 WP3 and ISO/IEC JTC1/SC29/WG11, JCTVC-E078, 5th Meeting: Geneva, Mar. 16-23, 2011.
Alshina, E., Chen, J., Alshin, A., Shlyakhov, N., and Han, W. J., CE3: Experimental results of DCTIF by Samsung, Joint Collaborative Team on Video Coding (JCT-VC) of ITU-T SG16 WP3 and ISO/IEC JTC1/SC29/WG11, JCTVC-D344, 4th Meeting: Daegu, Jan. 20-28, 2011.
International Search Report for PCT/JP2012/066039, ISA/JP, mailed Sep. 4, 2012.
Notice of Non-Final Rejection, Korean Patent Application No. 10-2013-7029324, Mar. 24, 2015.
Ken McCann, Woo-Jin Han, Il-Koo Kim, Jung-Hye Min, Elena Alshina, Alexander Alshin, Tammy Lee, Jianle Chen, Vadim Seregin, Sunil Lee, Yoon-Mi Hong, Min-Su Cheon, and Nikolay Shlyakhov, "Samsung's Response to the Call for Proposals on Video Compression Technology", JCTVC-A124 r2, pp. 12-14, 1st JCT-VC Meeting, Dresden, Apr. 2010.
Y. Vatis, B. Edler, D. T. Nguyen, and J. Ostermann: "Motion-and aliasing—compensated prediction using a two-dimensional non-separable adaptive Wiener interpolation filter", Proc. ICIP2005, IEEE International Conference on Image Processing, pp. II 894-897, Genova, Italy, Sep. 2005.
S. Wittmann and T. Wedi: "Separable adaptive interpolation filter for video coding", Proc. ICIP2008, IEEE International Conference on Image Processing, pp. 2500-2503, San Diego, California, USA, Oct. 2008.
Shohei Matsuo, Yukihiro Bandoh, Seishi Takamura, and Hirohisa Jozawa: "Enhanced region-based adaptive interpolation filter", Proc. PCS2010, IEEE Picture Coding Symposium pp. 526-529, Nagoya, Japan. Dec. 2010.
Faouzi Kossentini, Nader Mandi, Hsan Guennazi, and Mohammed Ali Ben Ayed: "An Adaptive Interpolation Filtering Technique", JCTVC-E284, 5th JCT-VC Meeting, Geneva, Mar. 2011.
Matsuo. S., Bandoh,Y., Ito,T., Takamura, S., and Jozawa, H., CE3: Region-based adaptive interpolation filter. Joint Collaborative Team on Video Coding (JCT-VC) of ITU-T SG16 WP3 and ISO/IEC JTC1/SC29AVG11 JCTVC-E078, Mar. 10, 2011.
Alshina, E., Chen, J., Alshin, A., Shlyakhov, N., and Han, W. J., CE3: Experimental results of DCTIF by Samsung, Joint Collaborative Team on Video Coding (JCT-VC) of ITU-T SG16 WP3 and ISO/IEC JTC1/SC29/WG11 4th Meeting: JCTVC-D344, Jan. 20, 2011.
Wu, Zhongmou, et al., "Combined adaptive-fixed interpolation with multi-directional filters," Signal Processing: Image Communication, vol. 24, No. 4, Apr. 2009, pp. 277-286.
Search Report, European Patent Application No. 12805330.3, Oct. 27, 2014.
Office Action, Taiwanese Patent Application No. 101122753, May 4, 2015.
Decision on Grant, Russian Patent Application No. 2013154760, Dec. 14, 2015.
Office Action, Chinese Patent Application No. 201280028582.3, Apr. 5, 2016.

* cited by examiner

A=1/32, B=-5/32, C=20/32

□ : INTEGER-ACCURACY PIXEL
⬢ : INTERPOLATION PIXEL $P_x$
□ : INTEGER POSITION PIXEL $P$
○ : INTERPOLATION TARGET PIXEL $\alpha$ : INTERPOLATION PIXEL POSITION ($0 \leq \alpha \leq 1$)

METHOD AND APPARATUS FOR ENCODING VIDEO, METHOD AND APPARATUS FOR DECODING VIDEO, AND PROGRAMS THEREFOR

CROSS-REFERENCE TO RELATED APPLICATIONS

This application is a 371 U.S. National Stage of International Application No. PCT/JP2012/066039, filed Jun. 22, 2012, which claims priority on Japanese Patent Application No. 2011-141725, filed Jun. 27, 2011, the content of which is incorporated herein by reference.

TECHNICAL FIELD

The present invention relates to a technology that achieves an improvement in the performance of interpolation filters in video coding and improves the coding efficiency.

BACKGROUND ART

In video coding, in a case of inter-frame prediction (motion compensation) coding, which performs prediction between different frames, an already decoded frame is referred to, a motion vector which minimizes the prediction error energy is determined, and a prediction error signal (also called a residual signal) thereof is subjected to orthogonal transform. Thereafter, quantization is applied, entropy encoding is performed, and finally binary data, i.e., a bitstream is obtained. In order to increase the coding efficiency, it is indispensable to reduce the prediction error energy, and thus a prediction scheme that provides high prediction accuracy is required.

A great number of tools for increasing the accuracy of inter-frame prediction have been introduced into video coding standard schemes. For example, if there is occlusion in the nearest frame, the prediction error energy can be further reduced by referring to a frame that is distant in the time domain to some extent, and thus, in H.264/AVC, multiple frames can be referred to. This tool is called multiple reference frame prediction. In addition, in order to be able to deal with motions having complex shapes, a block size can be subdivided, such as 16×8, 8×16, 8×4, 4×8, and 4×4, in addition to 16×16 and 8×8. This tool is called variable block size prediction.

Similar to these, ½ accuracy pixels are interpolated from integer-accuracy pixels of a reference frame using a 6-tap filter, and then ¼ accuracy pixels are generated by linear interpolation using these pixels. Accordingly, it becomes possible to realize accurate prediction for motions of fractional accuracy. This tool is called ¼ pixel accuracy prediction.

In order to develop the next-generation video coding standard scheme that provides higher coding efficiency than that of H.264/AVC, International Organization for Standardization/International Electrotechnical Commission "Moving Picture Experts Group" (the international organization for standardization ISO/IEC "MPEG") and International Telecommunication Union-Telecommunication Standardization Sector "Video Coding Experts Group" (ITU-T "VCEG") collaboratively established an investigation team (Joint Collaborative Team for Video Coding: JCT-VC). The next-generation standard scheme is called high efficiency video coding: HEVC, various novel coding technologies are now gathering from all over the world, and they are under discussion in the JCT-VC meetings.

Among them, in particular, many proposals related to inter-frame prediction (motion compensation) have been presented, and reference software for HEVC (HEVC test Model: HM) employs tools for improving the prediction efficiency of motion vectors and tools for extending the block size to 16×16 or larger.

Moreover, tools for increasing the interpolation accuracy of fractional-accuracy pixels have also been proposed, and a DCT-based interpolation filter: DCT-IF, in which interpolation filter coefficients are derived from basis of discrete cosine transform (DCT) coefficients, is highly effective and it is adopted in HM. In order to further increase the interpolation accuracy, interpolation filters which adaptively change interpolation filter coefficients on a frame-by-frame basis are also proposed, which are called adaptive interpolation filters: AIFs. The adaptive interpolation filter is highly effective in terms of an improvement in the coding efficiency, and it is also adopted in reference software for the next-generation video coding (key technical area: KTA) that was developed under the leadership of VCEG. Because of a high contribution to an improvement in the coding efficiency, an improvement in the performance of interpolation filters is a very expectative domain.

Conventional interpolation filters will be described in greater detail.

[Fixed Interpolation]

FIG. 8 is a diagram illustrating an interpolation method of a fractional-accuracy pixel in H.264/AVC. In H.264/AVC, as shown in FIG. 8, when a ½ pixel position is interpolated, interpolation is performed using six integer pixels in total including three points on the left side of the interpolation target pixel and three points on the right side of the interpolation target pixel. With respect to the vertical direction, interpolation is performed using six integer pixels in total including three points on the upper side and three points on the lower side. Filter coefficients are [(1, −5, 20, 20, −5, 1)/32]. After ½ pixels positions have been interpolated, ¼ pixels positions are interpolated using a mean filter of [½, ½]. Since it is necessary to interpolate all the ½ pixels positions, the computational complexity is high, but high-performance interpolation is possible, so that the coding efficiency is improved. Non-Patent Document 1 and so on disclose the above interpolation technology using a fixed filter.

Filters which use the same coefficient values for all the input pictures and for all the frames, such as a one-dimensional 6-tap filter of H.264/AVC, are called fixed interpolation filters.

As a scheme for further improving the performance of an interpolation filter adopted in H.264/AVC, the reference software HM for HEVC adopts a DCT-based interpolation filter (DCT-IF). FIG. 9 illustrates an interpolation method of a fractional-accuracy pixel by the DCT-based interpolation filter. As shown in FIG. 9, it is assumed that p denotes an interpolation target pixel at a fractional-accuracy position, $p_x$ denotes an integer position pixel, and $\alpha(0 \le \alpha \le 1)$ denotes a parameter indicating the position of p between integer position pixels. At this time, it is assumed that the number of integer position pixels to be used for interpolation, i.e., a tap length, is 2M (M is an integer that is greater than or equal to 1). From the definitional equation of DCT transform, Equation (1) holds.

[Equation 1]

$$C_k = \frac{1}{M} \sum_{l=-M+1}^{M} p(l)\cos\left(\frac{(2l-1+2M)k\pi}{4M}\right) \quad (1)$$

Moreover, from the definitional equation of inverse DCT transform, Equation (2) holds.

[Equation 2]

$$p(x) = \frac{C_0}{2} + \sum_{k=1}^{2M-1} C_k \cos\left(\frac{\pi(2x-1+2M)k}{4M}\right) \quad (2)$$

When x is regarded as a position, an equation for interpolating a pixel at a fractional position α is represented by the following Equation (3).

[Equation 3]

$$p(\alpha) = \frac{C_0}{2} + \sum_{k=1}^{2M-1} C_k \cos\left(\frac{\pi(2\alpha-1+2M)k}{4M}\right) \quad (3)$$

From Equation (3), it is possible to uniquely derive coefficients once the tap length 2M to be used for interpolation and the interpolation target position α are determined. Examples of an interpolation filter obtained from the above discussion are collected in Table 1 and Table 2. The details of the above are disclosed in Non-Patent Document 2.

TABLE 1

| Fractional Position α | Filter Coefficient Values (6-Tap Filter, 2M = 6) |
|---|---|
| −1/12 | {−4, 19, 254, −19, 8, −2} |
| 1/12 | {4, −16, 252, 22, −8, 2} |
| 1/6 | {6, −28, 242, 48, −17, 5} |
| 1/4 | {9, −37, 227, 75, −25, 7} |
| 2/6 | {11, −42, 208, 103, −33, 9} |
| 5/12 | {12, −44, 184, 132, −39, 11} |
| 1/2 | {11, −43, 160, 160, −43, 11} |
| 7/12 | {11, −39, 132, 184, −44, 12} |
| 2/3 | {9, −33, 103, 208, −42, 11} |
| 3/4 | {7, −25, 75, 227, −37, 9} |
| 5/6 | {5, −17, 48, 242, −28, 6} |

TABLE 2

| Fractional Position α | Filter Coefficient Values (12-Tap Filter, 2M = 12) |
|---|---|
| −1/12 | {1, −3, 5, −10, 22, 253, −19, 10, −6, 4, −2, 1} |
| 1/12 | {−1, 3, −5, 9, −19, 253, 23, −10, 6, −4, 2, −1} |
| 1/6 | {−2, 5, −9, 16, −34, 244, 49, −21, 12, −7, 4, −1} |
| 1/4 | {−1, 6, −12, 21, −43, 229, 75, −30, 17, −10, 5, −1} |
| 2/6 | {−3, 8, −15, 26, −50, 211, 105, −40, 22, −13, 7, −2} |
| 5/12 | {−3, 9, −16, 28, −53, 188, 134, −47, 26, −15, 8, −3} |
| 1/2 | {−2, 7, −15, 28, −52, 162, 162, −52, 28, −15, 7, −2} |
| 7/12 | {−3, 8, −15, 26, −47, 134, 188, −53, 28, −16, 9, −3} |
| 2/3 | {−2, 7, −13, 22, −40, 105, 211, −50, 26, −15, 8, −3} |
| 3/4 | {−1, 5, −10, 17, −30, 75, 229, −43, 21, −12, 6, −1} |
| 5/6 | {−1, 4, −7, 12, −21, 49, 244, −34, 16, −9, 5, −2} |

DCT-based interpolation filters are capable of dealing with any filter length and any interpolation accuracy and they are high-performance interpolation filters, so that they are adopted in the test model HM for HEVC.

[Adaptive Interpolation]

In H.264/AVC, the values of filter coefficients are constant, irrespective of conditions of an input picture (the type of a sequence, the size of a picture, and a frame rate) and coding conditions (the block size, the structure of a group of pictures (GOP), and quantization parameters (QP)). When the values of the filter coefficients are fixed, for example, effects that vary over time, such as aliasing, a quantization error, an error resulting from motion estimation, and camera noise, are not taken into consideration. Therefore, it is considered that an improvement in the performance is limited in terms of the coding efficiency. Accordingly, Non-Patent Document 3 proposes a scheme of adaptively changing interpolation filter coefficients, which is called a non-separable adaptive interpolation filter.

In Non-Patent Document 3, a two-dimensional interpolation filter (6×6=36 filter coefficients in total) is assumed, and the filter coefficients are determined so as to minimize the prediction error energy. Although it is possible to realize higher coding efficiency than that obtained by a one-dimensional 6-tap fixed interpolation filter used in H.264/AVC, the computational complexity for determining filter coefficients is very high, and thus Non-Patent Document 4 introduces a proposal for reducing the computational complexity.

The technique introduced in Non-Patent Document 4 is called a separable adaptive interpolation filter (SAIF), and it uses a one-dimensional 6-tap interpolation filter rather than a two-dimensional interpolation filter.

FIG. 10A to FIG. 10C are diagrams illustrating a method for interpolating a fractional-accuracy pixel in the separable adaptive interpolation filter (SAIF). Its procedure is such that, first, as shown by step 1 in FIG. 10B, pixels in the horizontal direction (a, b, and c) are interpolated. Integer-accuracy pixels C1 to C6 are used for determining filter coefficients. Filter coefficients in the horizontal direction that minimize a prediction error energy function $E_h^2$ of Equation (4) are analytically determined by the commonly known least square method (see Non-Patent Document 3).

[Equation 4]

$$E_h^2 = \sum_{x,y} \left( S_{x,y} - \sum_{c_i} w_{c_i} \cdot P_{\tilde{x}+c_i,\tilde{y}} \right)^2 \quad (4)$$

Here, S denotes an original picture, P denotes an already decoded reference picture, and x and y respectively denote positions in the horizontal direction and the vertical direction in a picture. Moreover, ~x (~ is a symbol placed above x; the same is also applied to the others) satisfies ~x=x+ $MV_x$−FilterOffset, where $MV_x$ denotes the horizontal component of a motion vector that has been obtained beforehand, and FilterOffset denotes an offset for adjustment (the value obtained by dividing a filter length in the horizontal direction by 2). With respect to the vertical direction, ~y=y+ $MV_y$ is satisfied, where $MV_y$ denotes the vertical component of the motion vector. $w_{c_i}$ denotes a group of filter coefficients in the horizontal direction $c_i$ (0≤$c_i$<6) that is to be determined.

Linear equations the number of which is equal to the number of the filter coefficients determined by Equation (4) are obtained, and minimizing processes are performed for fractional-pixel positions in the horizontal direction independently of one another. Through the minimizing processes, three groups of 6-tap filter coefficients are determined, and fractional-accuracy pixels a, b, and c are interpolated using these filter coefficient groups.

After the interpolation of the pixels in the horizontal direction has been completed, as shown by step 2 in FIG. 10C, an interpolation process in the vertical direction is performed. Filter coefficients in the vertical direction are determined by solving a linear problem similar to that in the horizontal direction. Specifically, filter coefficients in the vertical direction that minimize a prediction error energy function $E_v^2$ of Equation (5) are analytically determined.

[Equation 5]

$$E_v^2 = \sum_{x,y} \left( S_{x,y} - \sum_{c_j} w_{c_j} \cdot \hat{P}_{\tilde{x},\tilde{y}+c_j} \right)^2 \quad (5)$$

Here, S denotes an original picture, ^P (^ is a symbol placed above P) denotes a picture which has been decoded and then interpolated in the horizontal direction, and x and y respectively denote positions in the horizontal direction and the vertical direction in a picture. Moreover, ~x is represented as 4·(x+$MV_x$), where $MV_x$ denotes the horizontal component of a motion vector that has been rounded off to the nearest whole number. With respect to the vertical direction, ~y is represented as y+$MV_y$–FilterOffset, where $MV_y$ denotes the vertical component of the motion vector, and FilterOffset denotes an offset for adjustment (the value obtained by dividing a filter length by 2). $w_{c_j}$ denotes a group of filter coefficients in the vertical direction $c_j$ (0≤$c_j$≤6) that is to be determined.

Minimizing processes are performed for fractional-accuracy pixels independently of one another, and 12 groups of 6-tap filter coefficients are obtained. The remaining fractional-accuracy pixels are interpolated using these filter coefficients.

From the above, it is necessary to encode 90 (=6×15) filter coefficients in total and transmit them to a decoding end. In particular, since the overhead becomes large in low resolution coding, filter coefficients to be transmitted are reduced using the symmetry of a filter. For example, as show in FIG. 10A, viewed from integer-accuracy pixels, b, h, i, j, and k are positioned at the centers with respect to interpolation directions, and with respect to the horizontal direction, coefficients obtained by inverting coefficients to be used for three points on the left side can be applied to three points on the right side. Similarly, with respect to the vertical direction, coefficients obtained by inverting coefficients to be used for three points on the upper side can be applied to three points on the lower side ($c_1$=$c_6$, $c_2$=$c_5$, and $c_3$=$c_4$).

Additionally, since the relationship between d and l is symmetric about h, inverted filter coefficients can be used. That is, by transmitting 6 coefficients for d, their values can be applied to l. $c(d)_1$=$c(l)_6$, $c(d)_2$=$c(l)_5$, $c(d)_3$=$c(l)_4$, $c(d)_4$=$c(l)_3$, $c(d)_5$=$c(l)_2$, and $c(d)_6$=$c(l)_1$ are satisfied. This symmetry is also used for e and m, f and n, and g and o. Although the same theory holds for a and c, since the result for the horizontal direction affects interpolation in the vertical direction, a and c are transmitted separately without using symmetry. As a result of the use of the symmetry described above, the number of filter coefficients to be transmitted for each frame is 51 (15 for the horizontal direction and 36 for the vertical direction).

In the above adaptive interpolation filter of Non-Patent Document 4, the processing unit of the minimization process of the prediction error energy is fixed to a frame. 51 filter coefficients are determined per one frame. If an encoding target frame is roughly divided into two types of texture regions A and B (or multiple types), the optimum filter coefficients are a group of coefficients in which both of them (all the textures) are taken into consideration. Under a situation in which characteristic filter coefficients are essentially obtained only in the vertical direction with respect to the region A and filter coefficients are obtained only in the horizontal direction with respect to the region B, filter coefficients are derived as the average of both of them.

Non-Patent Document 5 proposes a method for achieving a reduction in the prediction error energy and realizing an improvement in the coding efficiency by performing division into regions in accordance with the local property of a picture and generating interpolation filter coefficients for each divided region, without being limited to one group of filter coefficients (51 coefficients) per one frame.

Moreover, in order to improve the performance of the adaptive interpolation filter of Non-Patent Document 4, a technology of grouping interpolation positions, selecting a fixed interpolation filter or an adaptive interpolation filter for each group so that the prediction error energy can be reduced, and generating an interpolated picture is proposed (see Non-Patent Document 6).

PRIOR ART DOCUMENTS

Patent Document

Patent Document 1: Japanese Unexamined Patent Application, First Publication No. 2011-82725

Non-Patent Documents

Non-Patent Document 1: Sakae Okubo, Shinya Kadono, Yoshihiro Kikuchi, and Teruhiko Suzuki, "H.264/AVC Textbook: 3rd Revised Edition", Impress R&D, pp. 119-123, 2009

Non-Patent Document 2: Ken McCann, Woo-Jin Han, Il-Koo Kim, Jung-Hye Min, Elena Alshina, Alexander Alshin, Tammy Lee, Jianle Chen, Vadim Seregin, Sunil Lee, Yoon-Mi Hong, Min-Su Cheon, and Nikolay Shlyakhov, "Samsung's Response to the Call for Proposals on Video Compression Technology", JCTVC-A124 r2, pp. 12-14, 1st JCT-VC Meeting, Dresden, April 2010

Non-Patent Document 3: Y. Vatis, B. Edler, D. T. Nguyen, and J. Ostermann: "Motion- and aliasing-compensated prediction using a two-dimensional non-separable adaptive Wiener interpolation filter", Proc. ICIP2005, IEEE International Conference on Image Processing, pp. II 894-897, Genova, Italy, September 2005

Non-Patent Document 4: S. Wittmann and T. Wedi: "Separable adaptive interpolation filter for video coding", Proc. ICIP2008, IEEE International Conference on Image Processing, pp. 2500-2503, San Diego, Calif., USA, October 2008

Non-Patent Document 5: Shohei Matsuo, Yukihiro Bandoh, Seishi Takamura, and Hirohisa Jozawa: "Enhanced region-based adaptive interpolation filter", Proc. PCS2010, IEEE Picture Coding Symposium, pp. 526-529, Nagoya, Japan, December 2010

Non-Patent Document 6: Faouzi Kossentini, Nader Mandi, Hsan Guermazi, and Mohammed Ali Ben Ayed: "An Adaptive Interpolation Filtering Technique", JCTVC-E284, 5th JCT-VC Meeting, Geneva, March 2011

SUMMARY OF INVENTION

Problems to be solved by the Invention

The interpolation filters disclosed in Non-Patent Document 4 and Non-Patent Document 5 are not provided with a function of switching an interpolation filter depending on each interpolation position, and thus there is room for improvement in terms of an increase in the performance of motion compensation.

The interpolation filter disclosed Non-Patent Document 6, which has adaptability with respect to interpolation positions, determines whether a fixed interpolation filter which has been previously defined for each interpolation position is to be used or an adaptive interpolation filter which has been derived on a frame-by-frame basis is to be used. This is a scheme in which selection of the filters is performed from the viewpoint of minimizing the prediction error energy and either one of them is necessarily selected.

In order to achieve an increase in the coding efficiency by selection from multiple interpolation filters, it is considered that the prediction error energy can be minimized if there is a wide range of choice for an interpolation filter. However, the method disclosed in Non-Patent Document 6 employs a choice between two alternatives, and thus it is considered that there is a limit on an improvement in performance. If it is possible to design an interpolation filter which realizes a further reduction in the prediction error energy by incorporating the weighted sum of multiple interpolation filters into the range of the choice, it is possible to realize an improvement in the coding efficiency.

In order to solve the above problems, an object of the present invention is to provide a novel scheme which extends the range of choice for an interpolation filter to thereby reduce the prediction error energy in inter-frame prediction with motion compensation than those of conventional technologies and improve the coding efficiency.

Means for Solving the Problems

As a method for achieving the above object, the present invention employs a weighted interpolation filter as an alternative in generation of an interpolated picture under an assumption that the weighted sum of multiple interpolation filters can further reduce the prediction error energy. If it is determined that the weighted interpolation filter minimizes the prediction error energy, weight coefficients are transmitted. With the present means, it is possible to more flexibly generate an interpolated prediction picture, and an improvement in the coding efficiency can be realized as a result of a reduction in the prediction error energy.

For example, the present invention performs the following processing in video encoding using fractional-accuracy motion compensation.

Interpolation positions of fractional-accuracy pixels are divided into multiple groups in accordance with a previously designated method or some another method.

Weighted filter coefficients are derived from multiple sets of interpolation filters using multiple parameters for each interpolation position group.

From among the weighted filter coefficients, weighted filter coefficients which minimize the prediction error energy are selected.

An interpolation filter with the weighted filter coefficients is applied to interpolate fractional-accuracy pixels for a reference picture and an input picture is encoded using fractional-accuracy motion compensation.

Weight parameters which designate weight values of the selected weighted filter coefficients and the interpolation filter coefficients used for the motion compensation are encoded and added to an encoded bitstream.

Moreover, for example, the present invention performs the following processing in video decoding using fractional-accuracy motion compensation.

Weight parameters which designate weight values of interpolation filter coefficients and interpolation filter coefficients for generating fractional-accuracy pixels are decoded for each interpolation position group.

Weighted filter coefficients determined by the weighted sum of the decoded interpolation filter coefficients are generated using the decoded weight parameters.

A prediction signal is generated using the generated weighted filter coefficients.

A residual signal is decoded and a decoded picture is generated using the residual signal and the prediction signal.

The following is the operation of the present invention. Conventional interpolation filters having adaptability with respect to interpolation positions employ a scheme of a choice between two alternatives with respect to a switching unit of an interpolation filter, and thus there is a limit on an improvement in performance. In contrast, for example, the present invention performs motion compensation by calculating the weighted sum of multiple filter coefficients to obtain the optimum weight coefficients for each interpolation position group and applying an interpolation filter using the weight coefficients. As a result, it is possible to more flexibly represent an interpolation filter, achieve an improvement in the performance of motion compensation by generating a filter that reduces the prediction error energy, and improve the coding efficiency.

Advantageous Effects of the Invention

The present invention can represent the weighted sum of interpolation filters, which cannot be taken into consideration by conventional interpolation filters having adaptability with respect to interpolation positions, extend the range of choice for an interpolation filter, and achieve an improvement in the coding efficiency as a result of a reduction in the prediction error energy.

MODES FOR CARRYING OUT THE INVENTION

Hereinafter, an embodiment of the present invention will be described with reference to drawings.

[Configuration Example of Video Encoding Apparatus]

Figure 1:
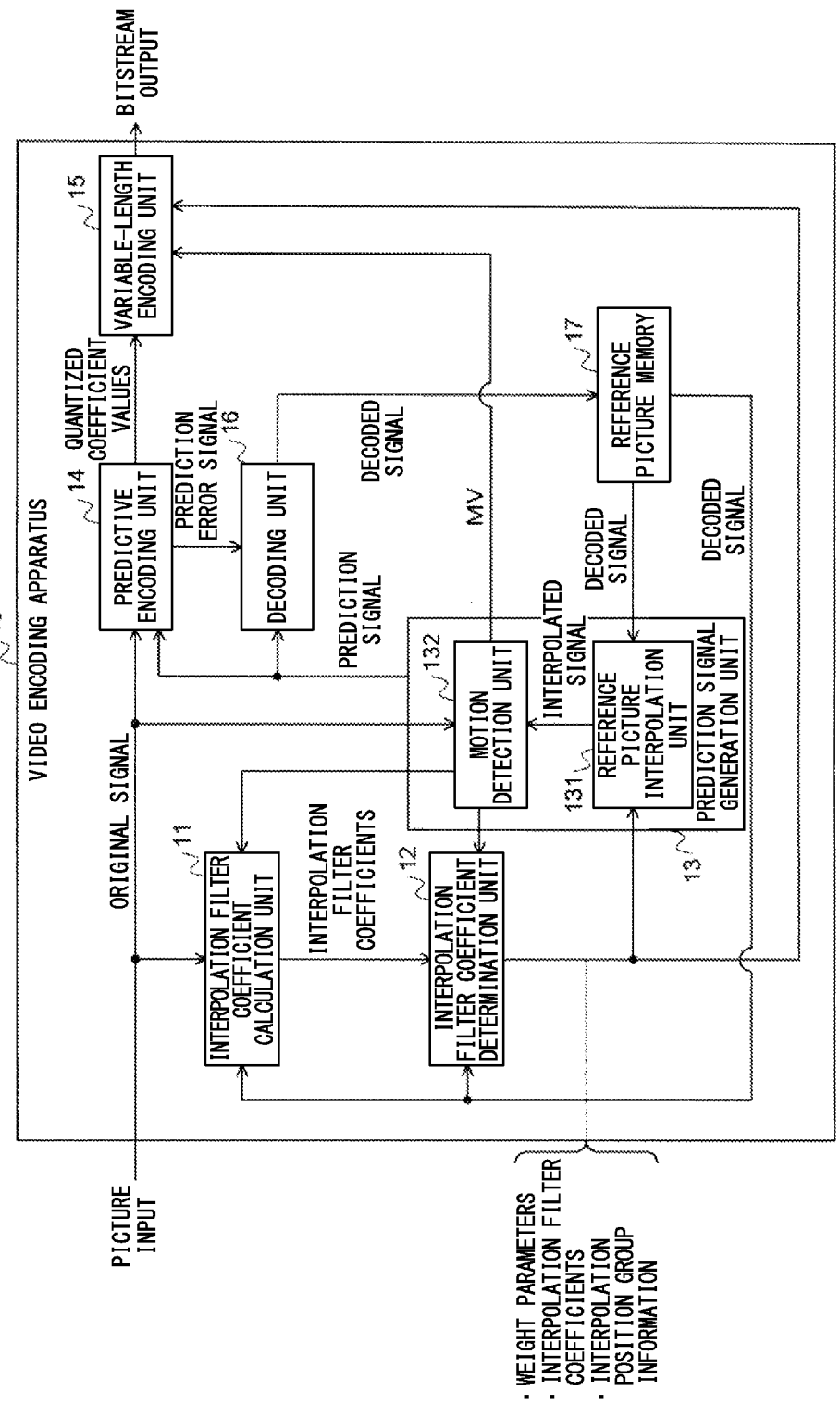
FIG. 1 is a diagram illustrating an example of a configuration of a video encoding apparatus in accordance with an embodiment of the present invention.

FIG. 1 is a diagram illustrating an example of a configuration of a video encoding apparatus in accordance with an embodiment of the present invention.

In a video encoding apparatus 10, an interpolation filter coefficient calculation unit 11 calculates interpolation filter coefficients of fractional-accuracy pixels used for a reference picture in predictive encoding. An interpolation filter coefficient determination unit 12 calculates the weighted sum of multiple filter coefficients to obtain the optimum weight coefficients using a motion vector MV detected by a motion detection unit 132 and outputs weight parameters and interpolation filter coefficients. Moreover, the interpolation filter coefficient determination unit 12 outputs interpolation position group information when interpolation position groups which are switching units of the weighted filter coefficients are dynamically determined.

A prediction signal generation unit 13 is provided with a reference picture interpolation unit 131 and the motion detection unit 132. The reference picture interpolation unit 131 applies an interpolation filter having interpolation filter coefficients selected by the interpolation filter coefficient determination unit 12 to an already decoded reference picture stored in a reference picture memory 17. The motion detection unit 132 performs a motion search on an interpolated reference picture to calculate a motion vector. The prediction signal generation unit 13 performs motion compensation using the fractional-accuracy motion vector calculated by the motion detection unit 132 to generate a prediction signal.

A predictive encoding unit 14 performs predictive encoding by, for example, calculating a residual signal between an input video signal and the prediction signal, performing orthogonal transform thereon, and quantizing transform coefficients. Moreover, a decoding unit 16 performs decoding on the result of the predictive encoding and stores a decoded picture in the reference picture memory 17 for later predictive encoding. At this time, an in-loop filter for removing coding noise, such as a deblocking filter or an adaptive loop filter (ALF), may be applied and then the storage may be performed.

A variable-length encoding unit 15 performs variable-length encoding on quantized transform coefficients and motion vectors as well as weight parameters and interpolation filter coefficients, which are outputs of the interpolation filter coefficient determination unit 12, and outputs them as an encoded bitstream. Moreover, when an interpolation position group of fractional-accuracy pixels, which is a switching unit of weighted filter coefficients, is dynamically determined, the variable-length encoding unit 15 also encodes information on the interpolation position group and adds it to the encoded bitstream.

[Configuration Example 1 of Interpolation Filter Coefficient Determination Unit]

Figure 2:
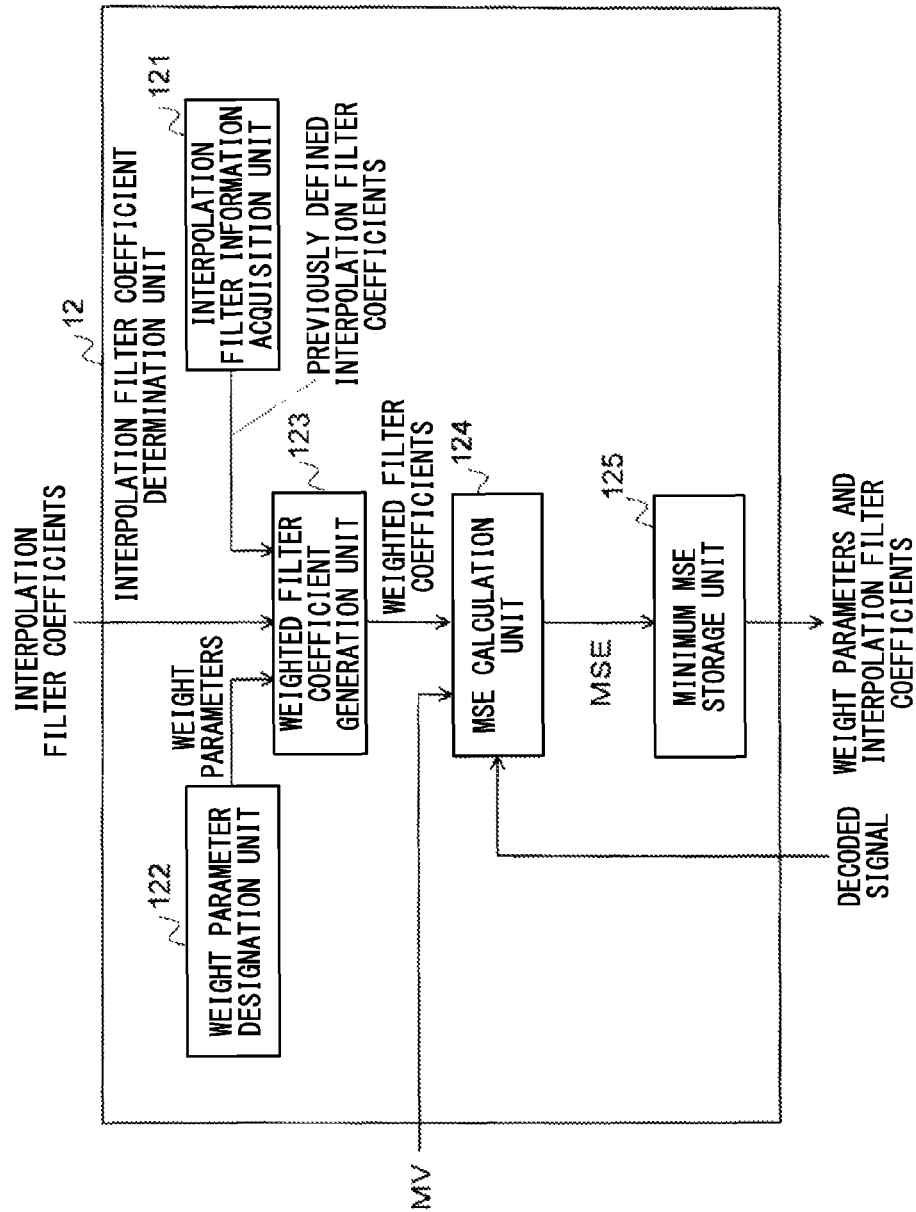
FIG. 2 is a diagram illustrating a configuration example 1 of an interpolation filter coefficient determination unit.

FIG. 2 is a diagram illustrating a first configuration example of the interpolation filter coefficient determination unit. The interpolation filter coefficient determination unit 12 is remarkably different from conventional technologies.

In the interpolation filter coefficient determination unit 12, an interpolation filter information acquisition unit 121 outputs the values of fixed interpolation filter coefficients, which are prepared in advance of encoding, to a weighted filter coefficient generation unit 123. For example, 6-tap coefficients defined in H.264/AVC, or 8-tap coefficients or 12-tap coefficients in DCT-IF may be used.

A weight parameter designation unit 122 sets weight parameter(s) and outputs the parameter(s) to the weighted filter coefficient generation unit 123. For example, when two kinds of filter coefficients are weighted, $\alpha$ is given as a weight parameter (it is sufficient that a single weight is given because there is a constraint of $\alpha+\beta=1$. Although two kinds of weights, $\alpha$ and $\beta$, may be transmitted, one kind of weight is transmitted in order to reduce an overhead). Similarly, when weights for three kinds of filters are calculated, $\alpha$ and $\beta$ are given because there is a constraint of $\alpha+\beta+\gamma=1$. The same is applied to a case of m (an integer greater than or equal to 4) kinds of weights.

The weighted filter coefficient generation unit 123 takes (a) an adaptive interpolation filter coefficient value: $f_A(x)$ generated on a frame-by-frame basis or on a region-by-region basis, (b) the weight parameter: a output from the weight parameter designation unit 122, and (c) a fixed interpolation filter coefficient value: $f_B(x)$ output from the interpolation filter information acquisition unit 121, as inputs, and performs the following calculation.

$$\alpha \times f_A(x) + \beta \times f_B(x) \text{ (where, } 0 \leq x \leq t, t \text{ is a tap length, and}$$
$$\beta = 1-\alpha)$$

Here, the weighted sum of two kinds of filter coefficients is assumed, and the weighted sum of three or more kinds of filter coefficients can be set in a similar manner. The weighted filter coefficient generation unit 123 outputs the obtained weighted filter coefficients to an MSE calculation unit 124 described below.

The MSE calculation unit 124 takes (a) motion vectors MV obtained by the motion search process, (b) a decoded signal (a local decoded picture), and (c) the weighted filter coefficients output from the weighted filter coefficient generation unit 123, as inputs, generates an interpolated picture at positions designated by the motion vectors MV using integer position pixels of the decoded picture and the weighted filter coefficients, and calculates a mean square error (MSE) with an original picture, i.e., prediction residual energy.

For example, the following equation can be used for an MSE.

$$\text{MSE} = \{\text{total sum of (original signal-prediction signal)}^2\}/\text{number of pixels}$$

The calculated MSE is output to a minimum MSE storage unit 125.

The minimum MSE storage unit 125 takes the MSE obtained by the MSE calculation unit 124 as an input and stores its value. The minimum MSE storage unit 125 compares a previously stored minimum value or a previously defined minimum value with the input MSE, determines that (a) the minimum MSE is the value of the input MSE if the value of the input MSE is smaller than the already stored minimum value and that (b) the minimum MSE is the already stored minimum value if the already stored minimum value is smaller than the value of the input MSE, and stores and updates the minimum value. Moreover, when the minimum value is stored, the minimum MSE storage unit 125 stores weight parameters that realize the MSE value.

In the interpolation filter coefficient determination unit 12, the MSE calculation unit 124 processes possible combinations related to an interpolation filter and then outputs a combination that realizes the minimum MSE, i.e., (1) weight parameters and (2) interpolation filter coefficients.

[Configuration Example 2 of Interpolation Filter Coefficient Determination Unit]

Figure 3:
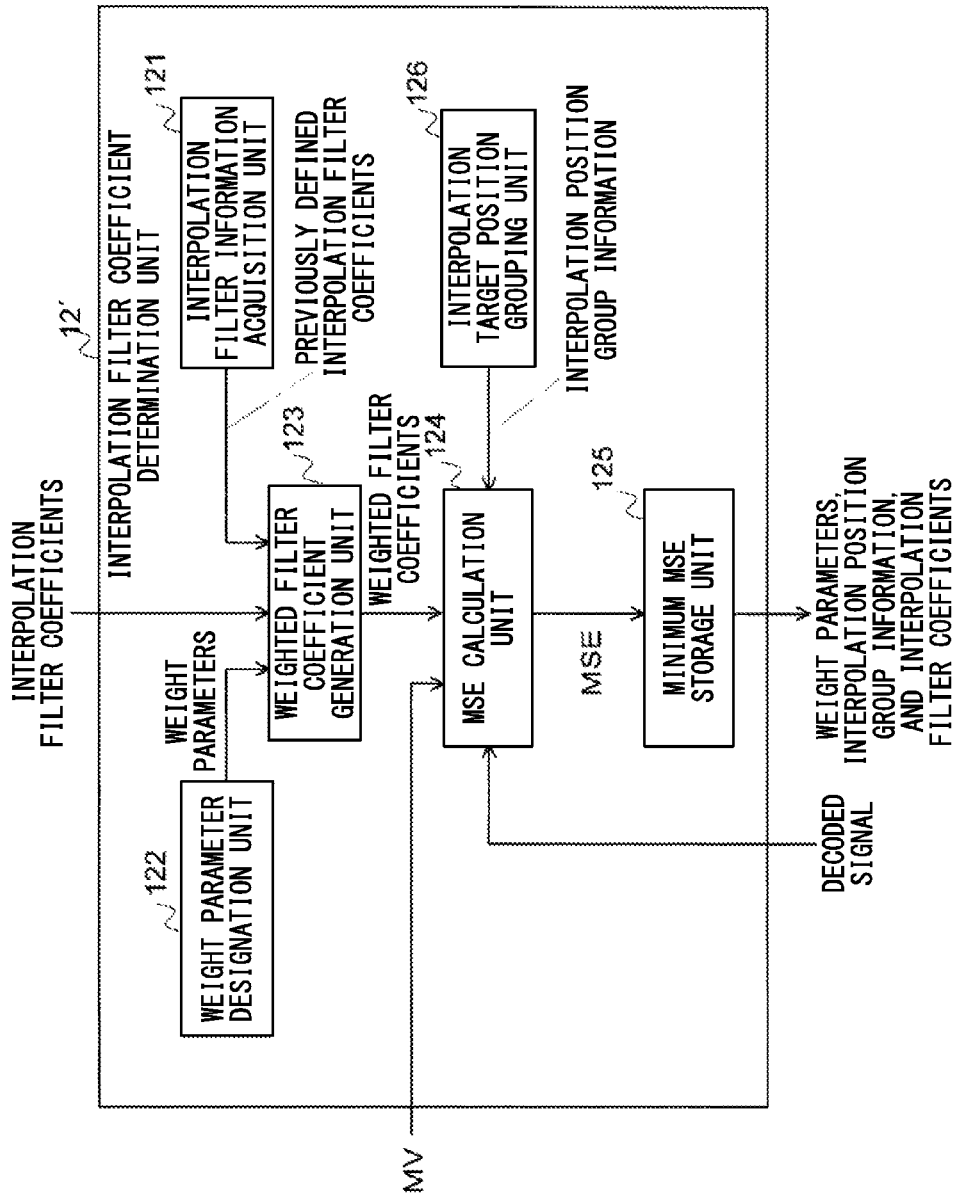
FIG. 3 is a diagram illustrating a configuration example 2 of the interpolation filter coefficient determination unit.

FIG. 3 is a diagram illustrating a second example of the configuration of the interpolation filter coefficient determination unit. An interpolation filter coefficient determination unit 12' shown in FIG. 3 is different from the interpolation filter coefficient unit 12 shown in FIG. 2 in that an interpolation target position grouping unit 126 is provided, the setting of the above-described weight parameters is performed for each of groups of interpolation positions, which are fractional pixel positions, and interpolation filter coefficients are switched for each of the groups of the interpolation positions.

Although the above-described configuration example 1 uses, for example, a weighted filter for all the pixel interpolation positions, the configuration example 2 sets weighted filter coefficients used for an interpolation process by an interpolation filter for each designated interpolation position group or each interpolation position group calculated using a given method. Whether to calculate the weighted sum of filter coefficients for a given interpolation position group or not may be selected. For example, it is possible to perform an adaptive process on interpolation position groups; e.g., a weighted filter is used for important interpolation positions and interpolation positions that are selected with a high probability, and a filter that is not subjected to weighing is used for the other positions.

The functions of the interpolation filter information acquisition unit 121, the weight parameter designation unit 122, and the weighted filter coefficient generation unit 123 are the same as those of the above-described configuration example 1.

The interpolation target position grouping unit 126 performs grouping for each interpolation position which is a fractional pixel position and outputs group information for each interpolation position. The interpolation position groups may be previously determined for fractional pixel positions, or they may be dynamically determined using, for example, a probability distribution of motion vectors.

The MSE calculation unit 124 generates an interpolated picture at positions designated by the motion vectors MV from integer position pixels of the decoded picture and the weighted filter coefficients using the weighted filter coefficients output from the weighted filter coefficient generation unit 123, for each interpolation position group designated by the interpolation target position grouping unit 126, and calculates an MSE with the original picture, i.e., prediction residual energy. The calculated MSE is output to the minimum MSE storage unit 125. Moreover, when the minimum value is stored, the minimum MSE storage unit 125 stores weight parameters and interpolation position group information that realize the MSE value.

The interpolation filter coefficient determination unit 12' examines possible combinations related to an interpolation filter and then outputs a combination which realizes the minimum MSE, i.e., (1) weight parameters, (2) interpolation position group information, and (3) interpolation filter coefficients. It is to be noted that when interpolation position groups are fixed and interpolation position group information can be shared by an encoding end and a decoding end, it is not necessary to output the interpolation position group information.

[Encoding Processing Flow]

Figure 4:
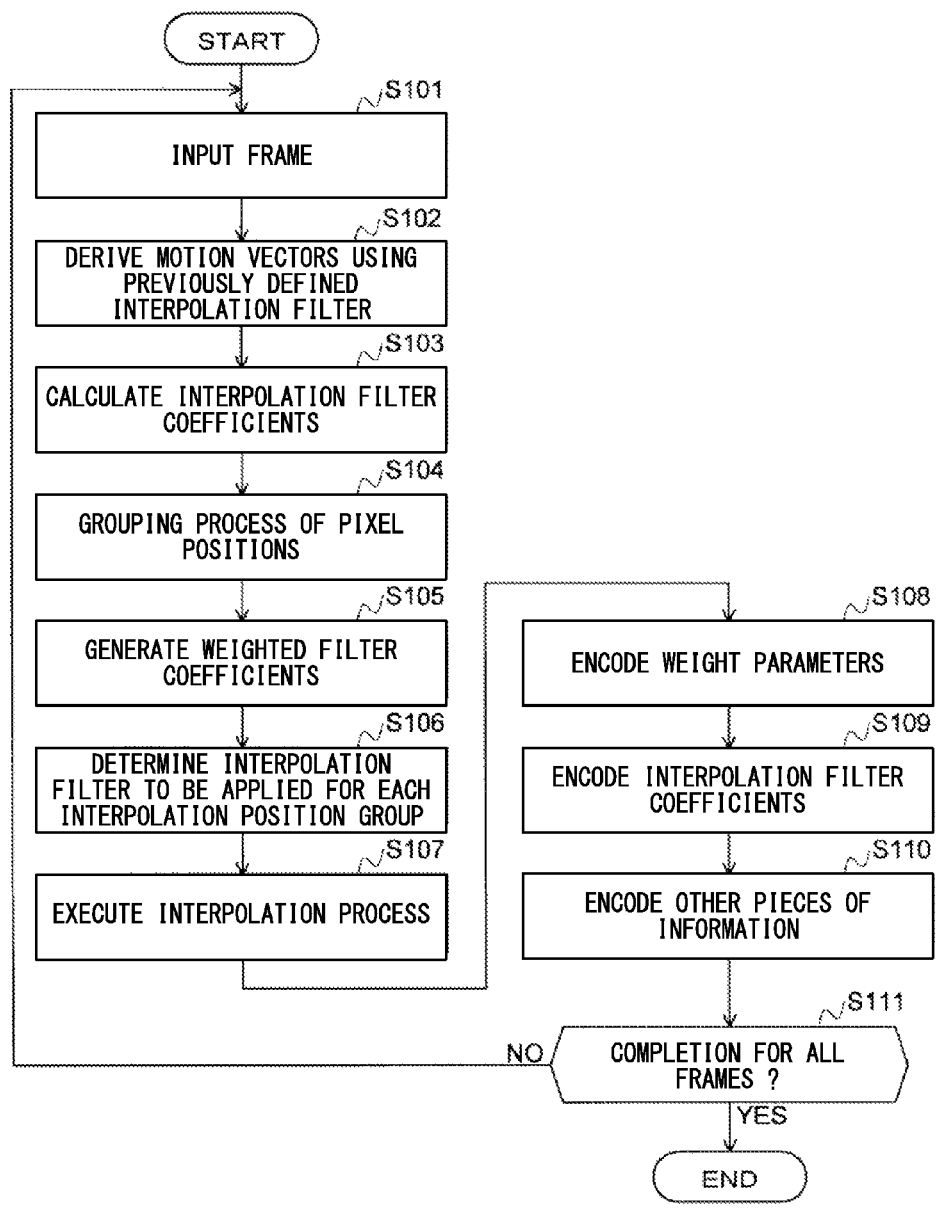
FIG. 4 is a flowchart of an encoding process in accordance with an embodiment of the present invention.

FIG. 4 is a flowchart of the processing of the video encoding apparatus shown in FIG. 1. Hereinafter, a flow of the processing when the video encoding apparatus encodes one frame will be described in accordance with FIG. 4. Here, an example of a process when the interpolation filter coefficient determination unit is configured with the configuration example 2 will be described, but a process in a case of the configuration 1 is almost the same. The following description assumes processing on luminance signals unless otherwise specified.

First, in step S101, a frame of an original picture required for an encoding process is input. Subsequently, in step S102, for example, a fixed interpolation filter provided in an encoder, such as a one-dimensional 6-tap filter adopted in H.264/AVC or a one-dimensional 8-tap or 12-tap filter as a DCT-based interpolation filter, is set as a previously defined interpolation filter, and motion vectors (MV) of the entire frame are derived using the interpolation filter. Here, the previously defined interpolation filter is not limited to a fixed interpolation filter, and an adaptive interpolation filter calculated, for example, in the previous frame may be adopted.

Subsequently, in step S103, the values of adaptive interpolation filter coefficients for an encoding target frame are calculated using the motion vectors obtained in step S102. In the calculation of the interpolation filter coefficients in the present step, a commonly-known method for minimizing the prediction error energy (linear regression) is used.

Subsequently, in step S104, grouping of interpolation target pixels to which interpolation filters are to be applied is performed. Specifically, the interpolation target pixels are divided into multiple groups depending on interpolation positions in accordance with a predetermined table. It is to be noted that interpolation position groups may be determined dynamically using a given method. When the interpolation position groups are determined dynamically, it is necessary to encode interpolation position group information and transmit it to a decoding end.

Subsequently, in step S105, weighted filter coefficients are generated for each of the interpolation position groups divided in step S104. Weight parameters are read from a table and are set, and weighted interpolation filter coefficients are generated from the weight parameters as shown in the following Equation (6).

$$\alpha \times f_A(x) + \beta \times f_B(x) \qquad (6)$$

Here, $\alpha$ and $\beta$ are the weight parameters ($\alpha+\beta=1$), $f_A(x)$ is a previously defined interpolation filter coefficient, and $f_B(x)$ is an interpolation filter coefficient determined in the present frame. x denotes a coefficient number and falls within a range of $0 \leq x < n$ (n denotes a tap length). Here, although a weighted filter coefficient of two kinds of filter coefficients is assumed, a weighted filter coefficient can be represented in a similar manner in a case of m (>2) kinds of interpolation filters.

Subsequently, in step S106, an interpolation filter which is actually applied to encoding is determined for each of the groups determined in step S104 using the weighted filter coefficients generated in step S105. For example, prediction error energy is set as an evaluation criterion (a cost function), prediction pictures are generated using the original picture and interpolation filters with the weight parameters selected in step S105, and weight parameters that minimize the sum of squared difference thereof are calculated. For example, as for the weight parameters, the value of $\alpha$ is changed in increments of 0.1 or 0.01, and $\alpha$ which realizes the smallest cost value is calculated.

Subsequently, in step S107, an interpolation process is performed using an interpolation filter defined by the weighted filter coefficients determined in step S106.

Subsequently, in step S108, the weight parameters calculated in step S106 is encoded. Subsequently, in step S109, interpolation filter information, such as the interpolation filter coefficients calculated in step S103, is encoded. When the interpolation position group information is to be transmitted, it is encoded in step S109. Subsequently, in step S110, all the remaining pieces of information to be encoded, such as prediction error signals (texture component information) and the motion vectors, are encoded.

Subsequently, in step S111, a determination as to whether an encoded frame is the final frame is performed. If the processed frame is not the final frame, the processing returns to step S101 in order to process the next frame. If the processed frame is the final frame, the encoding process is completed.

It is to be noted that a function of performing an encoding process by optimizing weight parameters of an interpolation filter for each interpolation position group stated in the present embodiment is not limited to application to luminance signals, and it is also applicable to chrominance signals in a similar manner.

[Configuration Example of Video Decoding Apparatus]

Figure 5:
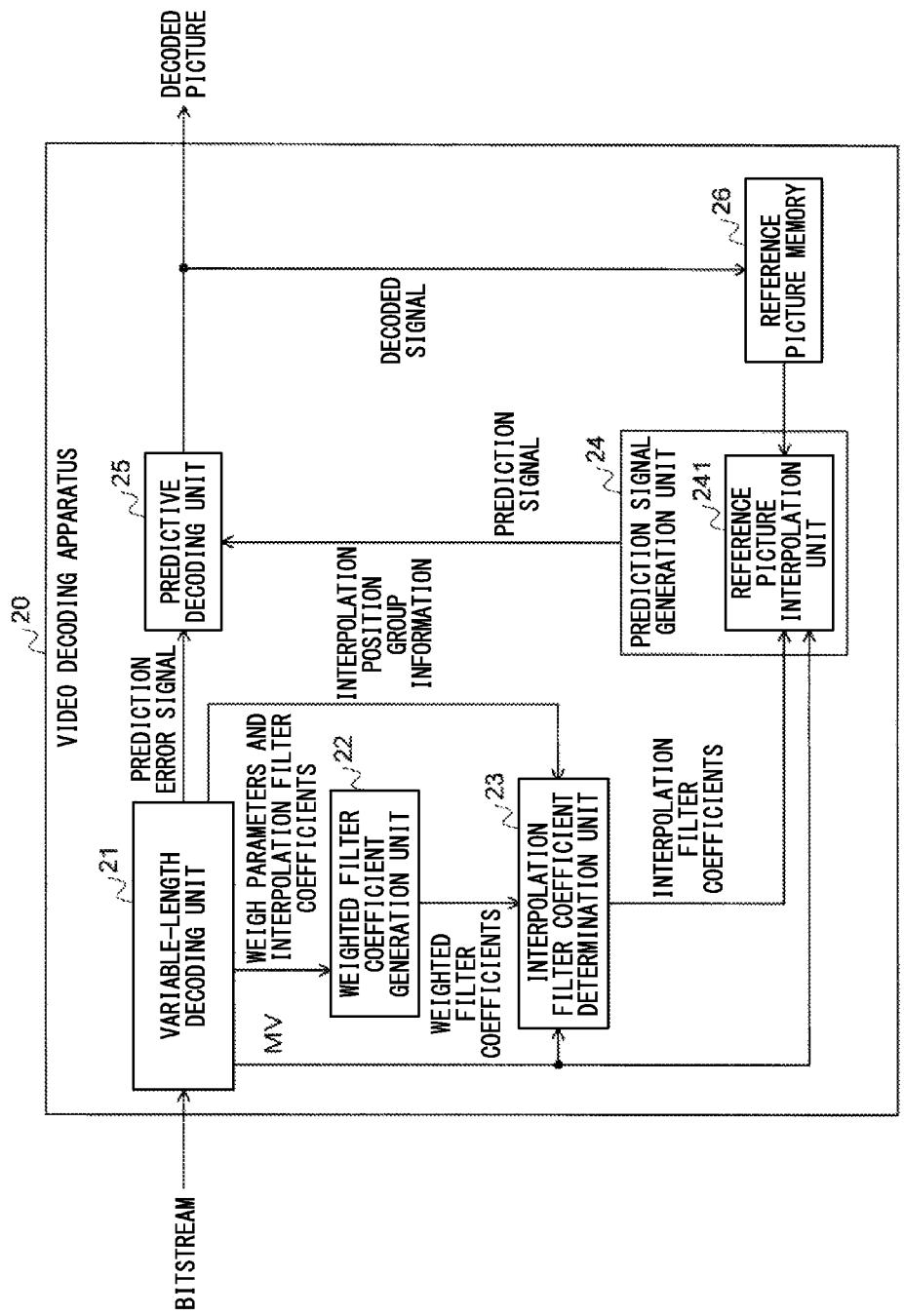
FIG. 5 is a diagram illustrating an example of a configuration of a video decoding apparatus in accordance with an embodiment of the present invention.

FIG. 5 is a diagram illustrating an example of a configuration of a video decoding apparatus in accordance with an embodiment of the present invention.

In a video decoding apparatus 20, a variable-length decoding unit 21 inputs an encoded bitstream and decodes quantized transform coefficients, motion vectors, weight parameters, interpolation filter coefficients, and so on. Moreover, when interpolation position group information is encoded, the variable-length decoding unit 21 also decodes the interpolation position group information.

A weighted filter coefficient generation unit 22 generates weighted filter coefficients from the weight parameters and the interpolation filter coefficients decoded by the variable-length decoding unit 21. An interpolation filter coefficient determination unit 23 determines interpolation filter coefficients used for each grouped interpolation position using the weighted filter coefficients generated by the weighted filter coefficient generation unit 22.

A reference picture interpolation unit 241 in a prediction signal generation unit 24 applies an interpolation filter with the interpolation filter coefficients received from the interpolation filter coefficient determination unit 23 to an already decoded reference picture stored in a reference picture memory 26 to restore fractional-accuracy pixels of a reference picture. The prediction signal generation unit 24 generates a prediction signal of a decoding target block from the reference picture, for which the fractional-accuracy pixels have been restored.

A predictive decoding unit 25 performs inverse quantization of the quantized coefficients decoded by the variable-length decoding unit 21, inverse orthogonal transform, and so on, adds a resultant calculated prediction error signal to the prediction signal generated by the prediction signal generation unit 24 to generate a decoded picture, and outputs it as an output picture. Moreover, the decoded picture decoded by the predictive decoding unit 25 is stored in the reference picture memory 26 for later predictive decoding. At this time, an in-loop filter for removing coding noise, such as a deblocking filter or an adaptive loop filter (ALF), may be applied and then the storage may be performed.

[Decoding Processing Flow]

Figure 6:
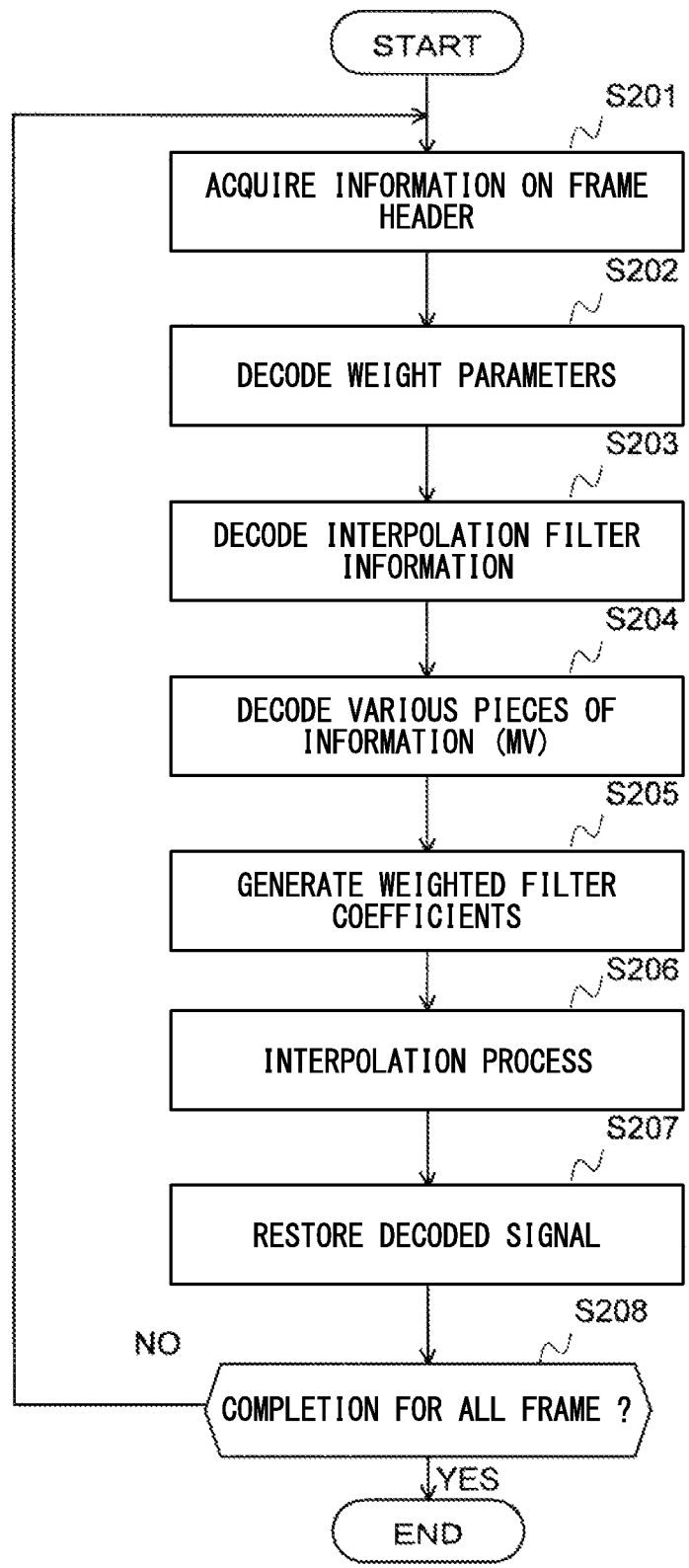
FIG. 6 is a flowchart of a decoding process in accordance with an embodiment of the present invention.

FIG. 6 is a flowchart of the processing of the video decoding apparatus shown in FIG. 5. Hereinafter, a flow of the processing in which the video decoding apparatus decodes one frame will be described in accordance with FIG. 6. The following description assumes the processing for luminance signals unless otherwise specified.

In step S201, information on a frame header (or a slice header) is acquired. Subsequently, in step S202, weight parameters are decoded and information thereon is stored. Subsequently, in step S203, information on interpolation filter coefficients is decoded. When interpolation position group information is encoded, the interpolation position group information is also decoded. Subsequently, in step S204, all the other pieces of information necessary for decoding (e.g., motion vectors and a prediction error signal) are decoded.

Subsequently, in step S205, weighted filter coefficients necessary for interpolating each interpolation position group are generated from the weight parameters decoded in step S202 and the interpolation filter coefficients decoded in step S203.

Subsequently, in step S206, an interpolation process is performed using the motion vectors decoded in step S204 and the weighted filter coefficients obtained in step S205 and a prediction signal is generated.

Subsequently, in step S207, the prediction error signal decoded in step S204 is combined with the prediction signal determined in step S206 to restore a decoded signal.

Subsequently, in step S208, a determination as to whether all the frames to be decoded have been decoded is performed, the processing returns to step S201 and transfers to decoding of the next frame if not all the frames have been decoded, and the decoding process is completed if all the frames have been decoded.

Although the above description is targeted for luminance signals, the present flow can also be applied to chrominance signals in a similar manner.

[Configuration Example when Software Program is Used]

The above video encoding and decoding processes can also be realized using a computer and a software program, the program may be recorded on a computer-readable recording medium, and the program may be provided through a network.

Figure 7:
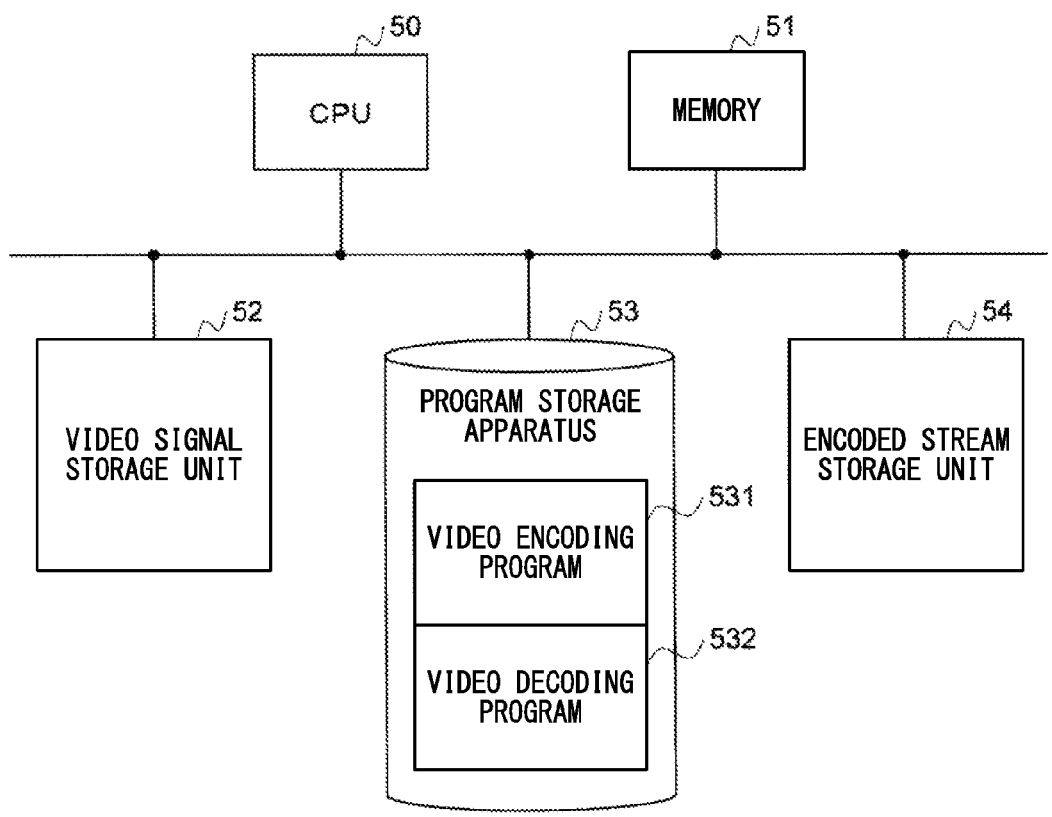
FIG. 7 is a diagram illustrating an example of a configuration of a system when an embodiment of the present invention is implemented using a computer and a software program.
Figure 8:
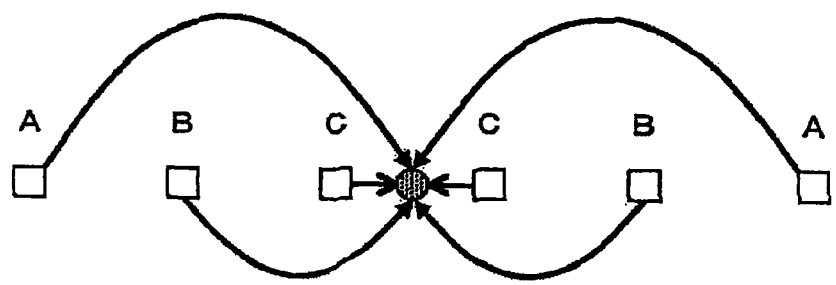
FIG. 8 is a diagram illustrating a method for interpolating a fractional-accuracy pixel in a video coding standard scheme (H.264/AVC).
Figure 9:
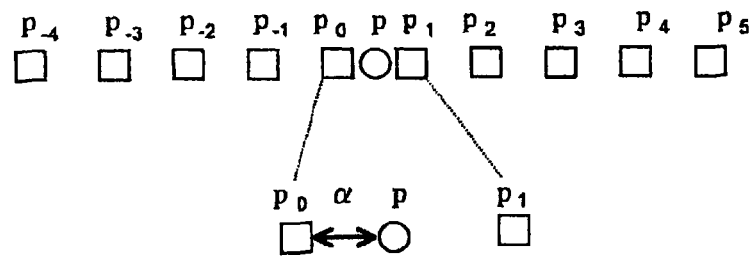
FIG. 9 is a diagram illustrating a method for interpolating a fractional-accuracy pixel in a DCT-based interpolation filter (DCT-IF).
Figure 10A:
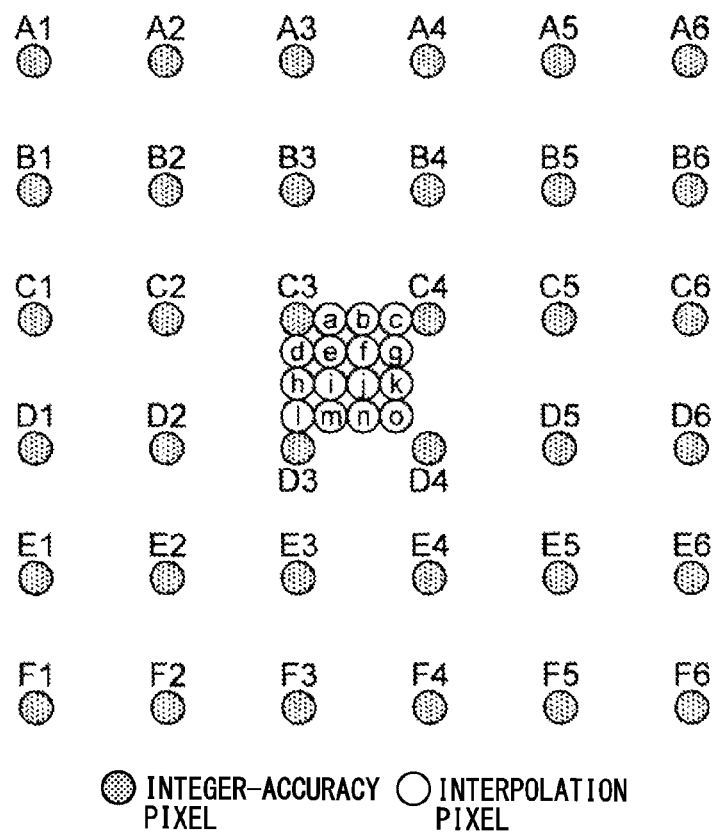
FIG. 10A is a diagram illustrating a method for interpolating a fractional-accuracy pixel in a separable adaptive interpolation filter (SAIF).
Figure 10B:
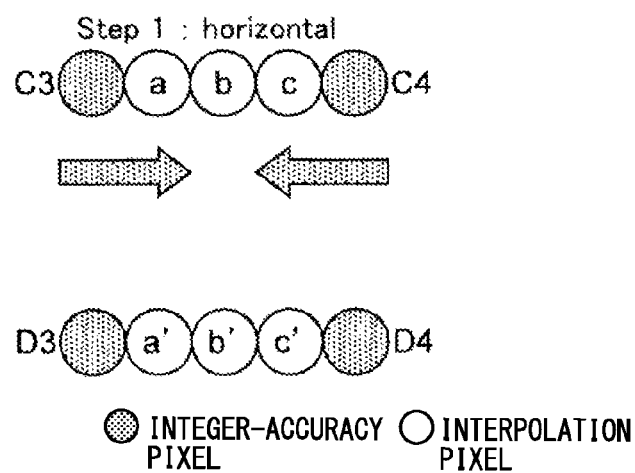
FIG. 10B is a diagram illustrating a method for interpolating a fractional-accuracy pixel in a separable adaptive interpolation filter (SAIF).
Figure 10C:
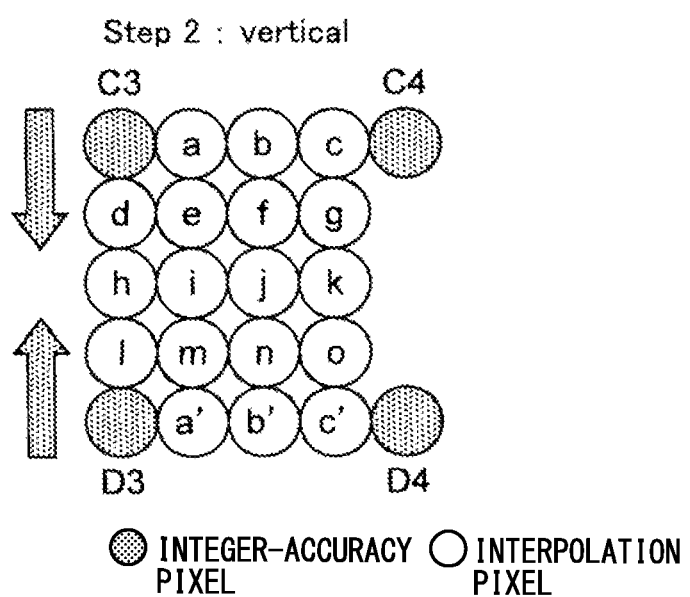
FIG. 10C is a diagram illustrating a method for interpolating a fractional-accuracy pixel in a separable adaptive interpolation filter (SAIF).

FIG. 7 illustrates an example of a configuration of a system when an embodiment of the present invention is implemented using a computer and a software program.

The present system has a configuration in which a central processing unit (CPU) 50 which executes a program, a memory 51 which stores the program and data accessed by the CPU 50, such as a random access memory (RAM), a video signal storage unit 52 which stores an encoding target video signal or a video signal of decoded pictures, a program storage apparatus 53 which stores a program for causing the CPU 50 to execute the processes described in the embodiment of the present invention, and an encoded stream storage unit 54 which stores a bitstream of an encoded result or a decoding target bitstream are connected with a bus.

The program storage apparatus 53 stores either a video encoding program 531 for encoding a video signal using an embodiment of the present invention or a video decoding program 532 for performing decoding on an encoded bitstream using an embodiment of the present invention. The program storage apparatus 53 may store both of these programs.

Moreover, when the present system is used as the video encoding apparatus, the video encoding program 531 is loaded on the memory 51, and the CPU 50 sequentially fetches and executes instructions of the video encoding program 531 loaded on the memory 51, the CPU 50 encodes a video signal stored in the video signal storage unit 52 using the technique described in an embodiment of the present invention, and the CPU 50 stores a bitstream of an encoded result in the encoded stream storage unit 54. Alternatively, the bitstream may be output to an external apparatus through an interface such as a network adapter.

Furthermore, when the present system is used as the video decoding apparatus, the video decoding program 532 is loaded on the memory 51, the CPU 50 sequentially fetches and executes instructions of the video decoding program 532 loaded on the memory 51, the CPU 50 performs decoding on a bitstream stored in the encoded stream storage unit 54 using the technique described in an embodiment of the present invention, and the CPU 50 stores a video signal of a decoded result in the video signal storage unit 52. Alternatively, the video signal of the decoded result is output to an external reproduction apparatus.

Although embodiments of the present invention have been described above with reference to the drawings, these embodiments are exemplification of the present invention, and it is apparent that the present invention is not limited by these embodiments. Therefore, addition, omission, replacement, and/or other modifications of structural elements that do not depart from the gist of the present invention may be made. That is, the present invention is not limited by the above description and is only limited by the claims stated below.

INDUSTRIAL APPLICABILITY

The present invention is applicable to, for example, video encoding and video decoding using inter-frame prediction with motion compensation. The present invention can extend the selectable range of an interpolation filter and achieve an improvement in the coding efficiency as a result of a reduction in the prediction error energy.

DESCRIPTION OF REFERENCE SIGNS 10 video encoding apparatus
11 interpolation filter coefficient calculation unit
12, 12', 23 interpolation filter coefficient determination unit
121 interpolation filter information acquisition unit
122 weight parameter designation unit
123, 22 weighted filter coefficient generation unit
124 MSE calculation unit
125 minimum MSE storage unit
126 interpolation target position grouping unit
13, 24 prediction signal generation unit
131, 241 reference picture interpolation unit
132 motion detection unit
14 predictive encoding unit
15 variable-length encoding unit
16 decoding unit
17, 26 reference picture memory
20 video decoding apparatus
25 variable-length decoding unit
25 predictive decoding unit

The invention claimed is:

1. A video encoding method using fractional-accuracy motion compensation, the method comprising:
a step of generating using a video encoding apparatus processor multipleسets of weighted filter coefficients corresponding to multiple weighted interpolation filters from interpolation filter coefficients of multiple interpolation filters and multiple weight parameters, weights designated by each of the multiple weight parameters respectively corresponding to the multiple interpolation filters;
a step of selecting using said video encoding apparatus processor a set of weighted filter coefficients which minimize prediction error energy in the fractional-accuracy motion compensation from among the multiple sets of the weighted filter coefficients, the selected set of the weighted filter coefficients corresponding to one of the multiple weighted interpolation filters;
a step of interpolating fractional-accuracy pixels for a reference picture by application of an interpolation filter with the selected set of the weighted filter coefficients and encoding an input picture with the fractional-accuracy motion compensation; and
a step of encoding using said video encoding apparatus processor a weight parameter used for generating the selected set of the weighted filter coefficients and the interpolation filter coefficients and adding an encoded weight parameter and encoded interpolation filter coefficients to an encoded bitstream.

2. The video encoding method according to claim 1, wherein selection of the set of the weighted filter coefficients is performed for each interpolation position group of the fractional-accuracy pixels calculated by a predetermined method or for each designated interpolation position group of the fractional-accuracy pixels, and
the interpolation filter with the selected set of the weighted filter coefficients is switched for each interpolation position group of the fractional-accuracy pixels.

3. A non-transitory computer-readable recording medium storing a video encoding program which causes a computer to execute the video encoding method according to claim 2.

4. The video encoding method according to claim 2, wherein the selection of the set of the weighted filter coefficients is performed for each of selected interpolation position groups that are selected from interpolation position groups that are determined by grouping positions of interpolation target pixels having fractional-accuracy, the interpolation position groups being determined using motion vectors, and
the interpolation filter with the selected set of the weighted filter coefficients is switched for each of the selected interpolation position groups.

5. A non-transitory computer-readable recording medium storing a video encoding program which causes a computer to execute the video encoding method according to claim 1.

6. A video encoding apparatus using fractional-accuracy motion compensation, the apparatus comprising:
a weighted filter coefficient generation unit which generates multiple sets of weighted filter coefficients corresponding to multiple weighted interpolation filters from interpolation filter coefficients of multiple interpolation filters and multiple weight parameters, weights designated by each of the multiple weight parameters respectively corresponding to the multiple interpolation filters;
a weighted filter coefficient selection unit which selects a set of weighted filter coefficients which minimize prediction error energy in the fractional-accuracy motion compensation from among the multiple sets of the weighted filter coefficients, the selected set of the weighted filter coefficients corresponding to one of the multiple weighted interpolation filters;
a first encoding unit which interpolates fractional-accuracy pixels for a reference picture by application of an interpolation filter with the selected set of the weighted filter coefficients and encodes an input picture with the fractional-accuracy motion compensation; and
a second encoding unit which encodes a weight parameter used for generating the selected set of the weighted filter coefficients and the interpolation filter coefficients and adds an encoded weight parameter and encoded interpolation filter coefficients to an encoded bitstream.

7. The video encoding apparatus according to claim 6, wherein selection of the set of the weighted filter coefficients is performed for each interpolation position group of the fractional-accuracy pixels calculated by a predetermined method or for each designated interpolation position group of the fractional-accuracy pixels, and
the interpolation filter with the selected set of the weighted filter coefficients is switched for each interpolation position group of the fractional-accuracy pixel.

8. The video encoding apparatus according to claim 7, wherein the selection of the set of the weighted filter coefficients is performed for each of selected interpolation position groups that are selected from interpolation position groups that are determined by grouping positions of interpolation target pixels having fractional-accuracy, the interpolation position groups being determined using motion vectors, and
the interpolation filter with the selected set of the weighted filter coefficients is switched for each of the selected interpolation position groups.

9. A video decoding method using fractional-accuracy motion compensation, the method comprising:
a step of decoding using a video decoding apparatus processor interpolation filter coefficients of multiple interpolation filters for generating fractional-accuracy pixels and a weight parameter, weights designated by the weight parameter respectively corresponding to the multiple interpolation filters;
a step of generating using said video decoding apparatus processor a set of weighted filter coefficients corresponding to a weighted interpolation filter determined by a weighted sum of the decoded interpolation filter coefficients using the weights;
a step of generating a prediction signal using the weighted interpolation filter determined by the generated set of the weighted filter coefficients;
a step of decoding using said video decoding apparatus processor a residual signal; and
a step of generating using said video decoding apparatus processor a decoded picture using the decoded residual signal and the generated prediction signal.

10. The video decoding method according to claim 9, wherein decoding of the interpolation filter coefficients for generating the fractional-accuracy pixels and the weight parameter is performed for each interpolation position group designated by an encoding end or for each predetermined interpolation position group, and
the weighted interpolation filter corresponding to the set of the weighted filter coefficients is switched for each interpolation position group.

11. A non-transitory computer-readable recording medium storing a video decoding program which causes a computer to execute the video decoding method according to claim 10.

12. The video decoding method according to claim 10, wherein the decoding of the interpolation filter coefficients for generating the fractional-accuracy pixels and the weight parameter is performed for each of interpolation position groups designated by the encoding end, the designated interpolation position groups being selected from interpolation position groups that are determined by grouping positions of interpolation target pixels having fractional-accuracy, the interpolation position groups being determined using motion vectors, and
the weighted interpolation filter corresponding to the set of the weighted filter coefficients is switched for each of the designated interpolation position groups.

13. A non-transitory computer-readable recording medium storing a video decoding program which causes a computer to execute the video decoding method according to claim 9.

14. A video decoding apparatus using fractional-accuracy motion compensation, the apparatus comprising:
a first decoding unit which decodes interpolation filter coefficients of multiple interpolation filters for generating fractional-accuracy pixels and a weight parameter, weights designated by the weight parameter respectively corresponding to the multiple interpolation filters;
a weighted filter coefficient generation unit which generates a set of weighted filter coefficients corresponding to a weighted interpolation filter determined by a weighted sum of the decoded interpolation filter coefficients using the weights;
a prediction signal generation unit which generates a prediction signal using the weighted interpolation filter determined by the generated set of the weighted filter coefficients;
a second decoding unit which decodes a residual signal; and
a decoded picture generation unit which generates a decoded picture using the decoded residual signal and the generated prediction signal.

15. The video decoding apparatus according to claim 14, wherein decoding of the interpolation filter coefficients for generating the fractional-accuracy pixels and the weight parameter is performed for each interpolation position group designated by an encoding end or for each predetermined interpolation position group, and
the weighted interpolation filter corresponding to the set of the weighted filter coefficients is switched for each interpolation position group.

16. The video decoding apparatus according to claim 15, wherein the decoding of the interpolation filter coefficients for generating the fractional-accuracy pixels and the weight parameter is performed for each of interpolation position groups designated by the encoding end, the designated interpolation position groups being selected from interpolation position groups that are determined by grouping positions of interpolation target pixels having fractional-accuracy, the interpolation position groups being determined using motion vectors, and the weighted interpolation filter corresponding to the set of the weighted filter coefficients is switched for each of the designated interpolation position groups.

* * * * *